Nov. 7, 1950      J. H. ORR      2,529,458

COLLAPSIBLE TOP STRUCTURE FOR MOTOR VEHICLES

Filed June 30, 1947      2 Sheets-Sheet 1

INVENTOR.
John H. Orr
BY Mawhinney & Mawhinney
Attorneys

INVENTOR.
John H. Orr
BY Mawhinney & Mawhinney
Attorneys

Patented Nov. 7, 1950

2,529,458

UNITED STATES PATENT OFFICE 2,529,458

COLLAPSIBLE TOP STRUCTURE FOR MOTOR VEHICLES

John Hewitt Orr, Coventry, England, assignor to Carbodies Limited, Coventry, England Application June 30, 1947, Serial No. 758,154
In Great Britain September 28, 1946

5 Claims. (Cl. 296—107)

1

The invention relates to a drop-head automobile—that is to say, to a head having a flexible portion connected to one or more hoops which are pivotally connected to the automobile body so that the head can be swung from an erected position into a stowed one, and vice versa.

The principal object of the invention is to provide an improved head which can be erected (and lowered) easily by a person within the automobile.

According to the main feature of the invention a head, for a drop-head automobile body, includes a hoop fast with the front edge of the fabric, the legs of the hoop, when the head is erected, providing uprights of which the feet abut stationary parts at opposite sides of the automobile body, the hoop being supported by pivoted means fast with its legs, and at least one of the said legs being fast with one coacting element of a locking means (which is preferably of the slam-type although any other suitable type can be used) of which the other coacting element is supported by a stationary part, the locking means being disposed for locking the head in its erected position and incorporating a manually-operable release means. Preferably a resiliently compressible means is disposed in such a position as to be compressed when the coacting elements of the locking means are in operative engagement with each other, so as to oppose free relative movement, due to clearance, between them.

The manually-operable release means is disposed in a convenient position within the automobile and, according to a further feature, it is provided with a remote-control which is manually-actuable from outside the automobile.

Figure 1:
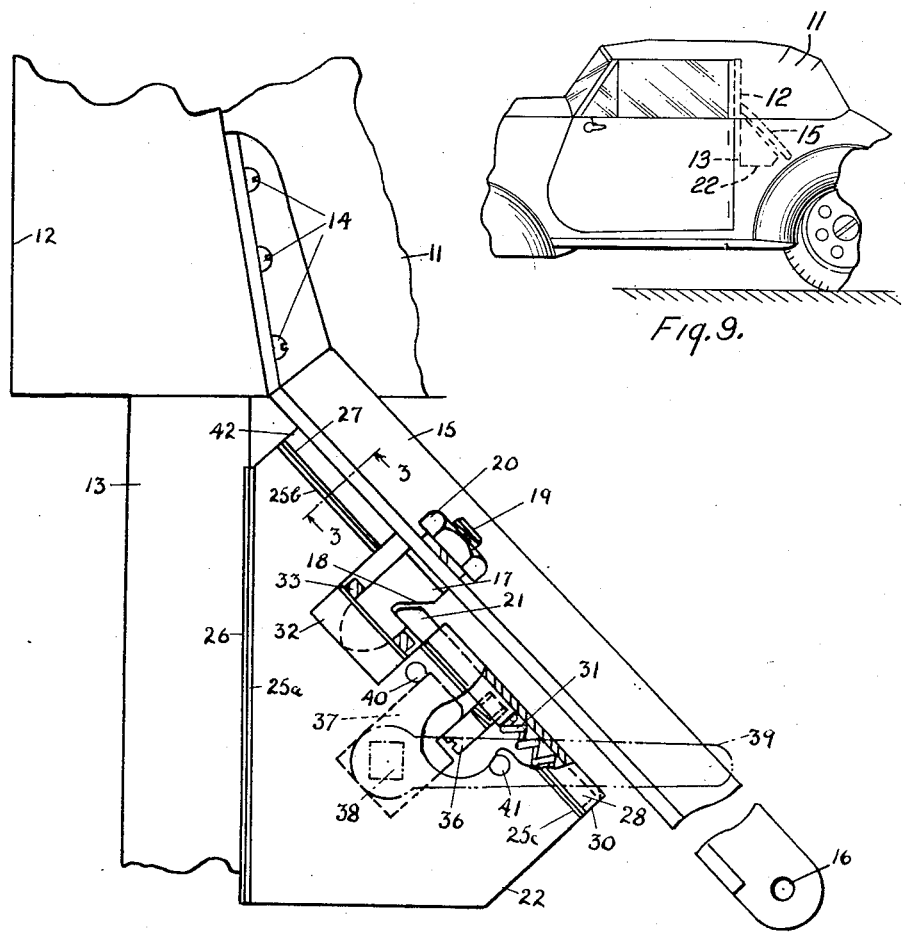
Figure 1 is a view, in elevation (as seen from inside a drop-head automobile body with a door at each side), illustrating a preferred construction according to the invention, the head being in its erected position and a part of the lock casing being broken away to expose the interior.
Figure 2:
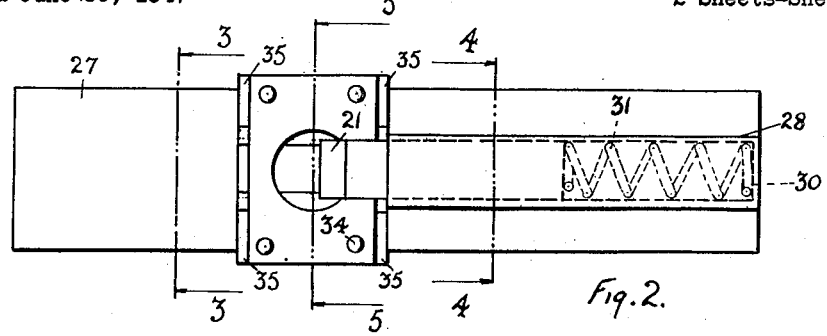
Figure 2 is a plan view of the locking means.
Figure 3:
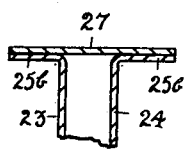
Figure 4:
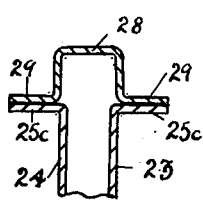
Figure 5:
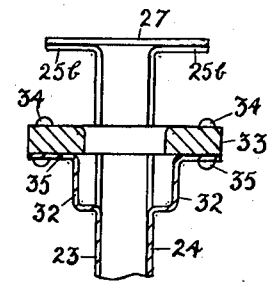
Figure 6:
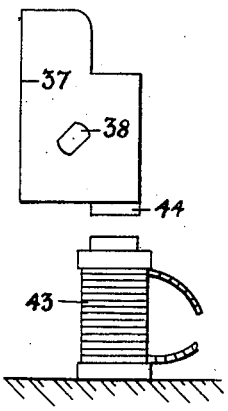
Figure 7:
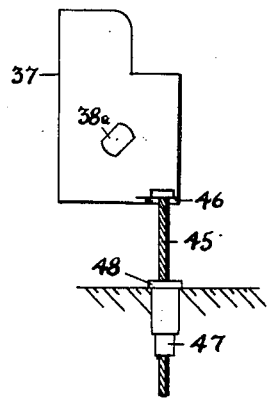
Figure 8:
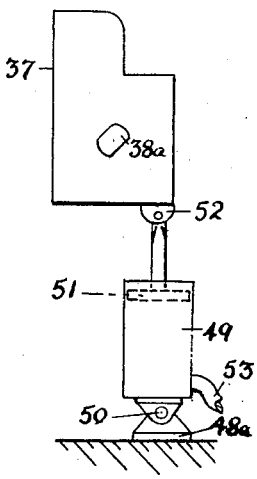

Figures 3, 4 and 5 are fragmentary sectional views taken on the lines 3—3, 4—4, and 5—5, respectively, of Figure 2, the line 3—3 also being shown in Figure 1;

Figures 6, 7 and 8 are diagrammatic views illustrating, respectively, electro-magnetic, mechanical, and pneumatic or hydraulic remote-control means for the locking means; and Figure 9 is a fragmentary view showing a drop-head automobile with the head erected and locked in accordance with the invention.

In Figure 1 the forward edge of the head-fabric 11 is made fast to a hoop (of wood, metal,

2 etc.) the feet of the legs 12 of which (a part of only one of which is shown) abut the upper side edges of the rear frame-member 13 of the door of the automobile body, on opposite sides of the latter, when the head is erected. The forward faces of the legs of the hoop can be aligned with guides within the door for a movable window housed within the latter. Each of the legs of the hoop is connected, as by screws 14, at the rearward side and near the bottom, to a pivot-arm 15 (which, as shown, can be of L-section) which pivotally connects it at 16 to the automobile body and carries a hook catch 17 of a slam-type locking means while the coating spring-pressed latch is supported behind the member 13 so that it can be concealed by the leather or other lining of the body. Obviously, of course, the head may have other hoops elsewhere and similarly supported by other pivot-arms (not shown).

Each of the hook catches 17 may be a bullet-nosed stub, as shown, having a lateral notch 18 and a screw-threaded stem 19 by which it can be located, by a nut 20, on the pivot-arm. Each catch 17 coacts with a spring-pressed latch 21 supported in a casing 22 on the automobile body, the latch being supported for movement at right angles to the axis of the stub, and having an inclined surface for engagement by the bullet-nose of the stub, to open the latch when the head is slammed into its erected position.

The casing 22 comprises spaced side plates (see Figures 3 to 5) 23, 24, with out-turned marginal flanges 25a, 25b and 25c for attachment, as by welding them respectively to a forward end plate 26, a top plate 27 and a latch-housing 28. The latter, which has out-turned attachment flanges 29, is wider than the distance between the plates 23, 24, (as shown by Figure 4) so that the upper edges of those plates, where they join the flanges 25c, support the latch 21. The end 30 of the housing is closed and locates the adjacent end of the latch-loading spring 31.

The flanges 25b and 25c are at different levels and there is a gap between their adjacent ends where the plates 23 and 24 are cranked at 32 (see Figure 5) to provide a seating for a striking plate 33, the latter being riveted at 34 to flanges 35 of the cranked portion and serving to coact with the stub 17.

The latch 21, which is urged by the spring 31 into the engaging position, has an abutment pin 36 for engagement by a latch lever 37 which is pivoted on a spindle having a squared end 38 to be engaged by a handle 39 for withdrawing the latch 21. The handle 39 will be within the automobile body so as to be conveniently disposed for the driver and the spindle can have a second handle on the outside of the body for alternative operation, the second handle preferably forming part of an ornamental beading of the body so as to be inconspicuous and shielded from accidental actuation.

Rivets 40 and 41, connecting the plates 23 and 24, provide limits for the latch movement.

Obviously any suitable type of locking means can be employed in place of the one shown.

It is preferred to interpose between the pivot-arm 15 and the latch casing (say the top plate 27) a resilient means, such as a deformable tube 42 of rubber (by which term I intend to include both natural and artificial rubber). In this way, the locking means is prevented from rattling when the head is erected.

When it is desired to erect the head, the driver, without leaving his seat, can grasp the head and pull it into its erected position in which it automatically becomes locked, and when it is desired to stow the head this can also be done from the driving seat, using the handle 39 and pushing the head backwards.

Instead of, or in addition to, actuating the lever 37 by the handle 39 provision may be made for actuating it, to withdraw the latch 21, by a remote-control and three such arrangements are indicated diagrammatically by Figures 6 to 8.

The manually-actuable member (not shown) of the remote-control can be located on the instrument board of the automobile, or in any other position, convenient for the driver, within the body. Alternatively, or additionally, it may be disposed outside the body.

The remote-control may be electrical, mechanical, pneumatic, or hydraulic in character, the manually-actuable member being of appropriate type. For instance, the manually-actuable member may take the form of a switch member for controlling, as indicated by Figure 6, an electro-magnet 43 which coacts with an armature 44 fast with the lever 37. Alternatively, it may be a lever, a push, pull, or other suitable member for actuating, as indicated by Figure 7, a Bowden-type control the flexible cable 45 of which is anchored to the lever 37 at 46 and the sheath 47 of which is anchored to a stationary part (which may be the lock casing) at 48. Or it may be a valve member in instances where the remote-control is of the hydraulic or pneumatic type, as indicated by Figure 8, the latter showing a cylinder 49 pivoted at 50 to a bracket (which is anchored at 48a to a stationary part) and a coacting piston 51 having its rod pivoted at 52 to the lever 37. The supply pipe, for the working fluid, to the cylinder is shown at 53.

What I claim as my invention and desire to secure by Letters Patent of the United States is:

1. A drop-head automobile body including a hoop having legs with feet supporting the front edge of the head-fabric, an arm fast with each of the legs of the hoop and pivoted upon the body whereby the head can be moved into a stowed or erected position, the main portion of each arm when the head is erected being inclined to the vertical and abutting a correspondingly inclined member fast with the body, and the legs of the hoop when the head is in the erected position being substantially vertical with their feet abutting stationary parts of the body, a compressible resilient means between the said inclined portion and member, a slidable spring-pressed latch carried by the inclined member substantially parallel to the inclination thereof, a hook catch extending substantially at right-angles from the main portion of said arm and adapted to automatically coact with and be retained by said latch when the head is moved into the erected position, and means for withdrawing said latch from the hook catch when the head is to be stowed.

2. The combination of claim 1, characterised in that each of said arms is of L-section, one of the flanges carrying said hook catch in the form a a bullet-nosed stub with a lateral notch.

3. In combination, an automobile body having a frame member, a drop-head including a hoop having legs with feet adapted to rest on said frame member when the drop-head is erected, an arm pivotally mounted on the automobile body and secured to said hoop for swinging the drop-head to a stowed position, a casing carried by the automobile body between said frame member and arm and having an opening therein facing said arm, a striking plate concealed within said casing inwardly of the opening, a hook catch carried by said arm in position to enter the opening and engage the striking plate when the drop-head is erected, a slidable spring-pressed latch, a latch housing for said latch secured to said casing in position to direct the latch into engagement with said hook catch, and means on the exterior of said casing coupled to said spring-pressed latch to retract the latter out of engagement with said hook catch, said casing also containing and supporting a means whereby said spring-pressed latch is so coupled.

4. The combination of claim 3 in which said last named means comprises a latch lever within said casing, a projection on said slidable latch projected by the latch spring into engagement with said latch lever in the projected position of the latch, and a handle externally of said casing coupled to said latch lever for rocking the same.

5. The combination of claim 1, further comprising a latch housing for supporting said spring-pressed latch, and a casing for said means for withdrawing said latch from said hook catch, said casing comprising side plates having outturned marginal flanges, said casing also comprising a forward end plate and a top plate, said forward end plate secured to said automobile body, said top plate being the said correspondingly inclined member, and said forward end plate, said top plate, and said latch housing being secured to certain of said flanges on said side plates.

JOHN HEWITT ORR.

REFERENCES CITED

The following references are of record in the file of this patent:

UNITED STATES PATENTS

| Number | Name | Date |
|---|---|---|
| 166,546 | Ogden | Aug. 10, 1875 |
| 201,824 | Owen et al. | Mar. 26, 1878 |
| 968,894 | Teppert | Aug. 30, 1910 |
| 1,753,931 | Lewis | Apr. 8, 1930 |
| 2,070,699 | Westrope | Feb. 16, 1937 |

FOREIGN PATENTS

| Number | Country | Date |
|---|---|---|
| 353,380 | France | June 27, 1905 |
| 512,566 | Great Britain | Sept. 20, 1929 |
| 518,801 | Great Britain | Mar. 7, 1940 |